US012658189B2

(12) United States Patent      (10) Patent No.:    US 12,658,189 B2

Xu                    (45) Date of Patent:      Jun. 16, 2026

(54) METHOD FOR RESPONDING TO CONTROL VOICE, DEVICE, AND STORAGE MEDIUM

(71) Applicant: GUANGDONG OPPO MOBILE TELECOMMUNICATIONS CORP., LTD., Dongguan (CN)

(72) Inventor: Weinan Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 350 days.

(21) Appl. No.: 18/368,058

(22) Filed: Sep. 14, 2023

(65) Prior Publication Data

US 2024/0005922 A1     Jan. 4, 2024

Related U.S. Application Data

(63) Continuation of application No. PCT/CN2022/076080, filed on Feb. 11, 2022.

(30) Foreign Application Priority Data

Mar. 15, 2021    (CN) ......................... 202110274472.6

(51) Int. Cl.
     *G10L 15/22*        (2006.01)
     *G01S 5/02*         (2010.01)
           (Continued)

(52) U.S. Cl.
     CPC ............ *G10L 15/22* (2013.01); *G01S 5/0284* (2013.01); *G01S 13/0209* (2013.01); *G06F 1/163* (2013.01)

(58) Field of Classification Search
     CPC ... G10L 15/22; G01S 5/0284; G01S 13/0209; G06F 1/163
     See application file for complete search history.

(56) References Cited

U.S. PATENT DOCUMENTS 6,219,645 B1 * 4/2001 Byers ..................... G10L 15/02
                                        704/275
10,354,651 B1 * 7/2019 Yi ........................... G06F 3/167
            (Continued)

FOREIGN PATENT DOCUMENTS

CN        107408386 A     11/2017
CN        108966067 A     12/2018
           (Continued)

OTHER PUBLICATIONS

Extended European Search Report for European Application No. 22770239.6 dated Jun. 28, 2024.

(Continued)

*Primary Examiner* — Brian L Albertalli

(74) *Attorney, Agent, or Firm* — Sheppard, Mullin, Richter & Hampton LLP

(57)          ABSTRACT

A method for responding to a control voice, a device, and a non-transitory storage medium are provided. The method is implemented by a master device that communicates with at least two slave devices located in different orientations. The localization information of at least one of the slave devices relative to a wearable device is obtained, where the location information of each of the at least one of the slave devices is obtained based on location information of the wearable device collected by the slave device through a localization component. A target slave device located in a directly facing direction of a user is determined based on the localization information, where the user is wearing the wearable device. Instruction information is transmitted to the target slave device, where the instruction information is configured to instruct the target slave device to respond to the control voice.

20 Claims, 8 Drawing Sheets

(51) Int. Cl.
  *G01S 13/02* (2006.01)
  *G06F 1/16* (2006.01)

(56) References Cited

U.S. PATENT DOCUMENTS

| | | | | |
|---|---|---|---|---|
| 2002/0105575 A1* | 8/2002 | Hinde | | G10L 15/24 |
| | | | | 704/E15.041 |
| 2012/0259638 A1* | 10/2012 | Kalinli | | G10L 25/78 |
| | | | | 704/E11.001 |
| 2014/0330560 A1* | 11/2014 | Venkatesha | | G06F 21/32 |
| | | | | 704/235 |
| 2015/0109191 A1* | 4/2015 | Johnson | | G02B 27/017 |
| | | | | 345/156 |
| 2016/0284350 A1* | 9/2016 | Yun | | G10L 15/22 |
| 2017/0337921 A1* | 11/2017 | Aoyama | | G06F 3/167 |
| 2018/0146042 A1 | 5/2018 | Choi | | |
| 2018/0211665 A1 | 7/2018 | Park et al. | | |
| 2019/0098070 A1* | 3/2019 | Kim | | G06F 3/013 |
| 2019/0132685 A1* | 5/2019 | Skoglund | | G10L 21/02 |
| 2019/0208318 A1* | 7/2019 | Chowdhary | | B81B 7/00 |
| 2019/0385600 A1 | 12/2019 | Kim | | |
| 2019/0387152 A1 | 12/2019 | Sivan | | |
| 2019/0392830 A1* | 12/2019 | Abdollahian | | G06V 10/764 |
| 2020/0072937 A1 | 3/2020 | Baek et al. | | |
| 2020/0103963 A1* | 4/2020 | Kelly | | G06F 3/0487 |
| 2022/0103927 A1* | 3/2022 | Bhowmik | | G06F 3/167 |

FOREIGN PATENT DOCUMENTS

| | | |
|---|---|---|
| CN | 109032039 A | 12/2018 |
| CN | 109521396 A | 3/2019 |
| CN | 110322878 A | 10/2019 |
| CN | 110827818 A | 2/2020 |
| CN | 110989372 A | 4/2020 |
| CN | 111192591 A | 5/2020 |
| CN | 111343058 A | 6/2020 |
| CN | 111354360 A | 6/2020 |
| CN | 112272279 A | 1/2021 |

OTHER PUBLICATIONS

CNIPA, First Office Action for CN Application No. 202110274472. 6, Jan. 5, 2023.

CNIPA, Second Office Action for CN Application No. 202110274472. 6, Aug. 18, 2023.

WIPO, International Search Report for PCT Application No. PCT/CN2022/076080, Apr. 18, 2022.

CNIPA, Decision of Rejection for CN Application No. 202110274472. 6, Jan. 4, 2024.

* cited by examiner

METHOD FOR RESPONDING TO CONTROL VOICE, DEVICE, AND STORAGE MEDIUM

This application a continuation of International Application PCT/CN2022/076080, filed Feb. 11, 2022, which claims priority to Chinese patent application No. 202110274472.6, filed Mar. 15, 2021, both of which are herein incorporated by reference in their entireties.

TECHNICAL FIELD

The disclosure relates to the field of voice control, and particularly to a method for responding to a control voice, a device, and a non-transitory storage medium.

BACKGROUND

With the development of intelligent home technology, intelligent control functions are gradually added to home appliances in daily life, in which voice control is widely used as a common control method.

In the related art, an intelligent device is provided with a microphone to monitor a user's voice. After the user speaks a control voice, the intelligent device performs a corresponding action responsive to the control voice. However, when multiple intelligent devices capable of responding to the control voice are provided in the home, there would be a chaotic scenario where the multiple intelligent devices respond to the user's control voice at the same time.

SUMMARY

Embodiments of the disclosure provide a method for responding to a control voice, a device, a non-transitory storage medium. The technical solutions are as follows.

According to an aspect of the disclosure, a method for responding to a control voice is provided. The method is implemented by a master device that communicates with at least two slave devices located in different orientations, and the method includes:

obtaining localization information of at least one of the slave devices relative to a wearable device, where the location information of each of the at least one of the slave devices is obtained based on location information of the wearable device collected by the slave device through a localization component;

determining, based on the localization information, a target slave device located in a directly facing direction of a user, where the user is wearing the wearable device; and transmitting instruction information to the target slave device, where the instruction information is configured to instruct the target slave device to respond to the control voice.

According to another aspect of the disclosure, a device is provided. The terminal device includes a processor and a memory. The memory stores at least one computer instruction which, when being loaded and executed by the processor, causes a method for responding to a control voice to be implemented. The method includes:

obtaining localization information of at least one slave device relative to a wearable device, where the device communicates with at least two slave devices including the at least one slave device, and the localization information of each of the at least one slave device is obtained based on location information of the wearable device collected by the slave device through a localization component;

in response to the wearable device being worn on a user, determining, based on the localization information, a target slave device located in a directly facing direction of the user; and transmitting instruction information to the target slave device, where the instruction information is configured to instruct the target slave device to respond to the control voice.

According to yet another aspect of the disclosure, a non-transitory computer-readable storage medium is provided. The storage medium stores at least one computer instruction which, when being loaded and executed by a processor, causes a method for responding to a control voice to be implemented by a master device that communicates with at least two slave devices located in different orientations, and the method includes:

obtaining localization information of at least one of the at least two slave devices relative to each of a first component and a second component of the wearable device, where the localization information of each of the at least one of the slave devices is obtained based on location information of the first component and the second component collected by the slave device through a localization component, the first component is worn on a left side of a user, and the second component worn on a right side of the user;

determining, based on the localization information, a target slave device located directly in front of the user; and transmitting instruction information to the target slave device, where the instruction information is configured to instruct the target slave device to respond to the control voice.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

DETAILED DESCRIPTION OF PREFERRED EMBODIMENTS

Figure 1:
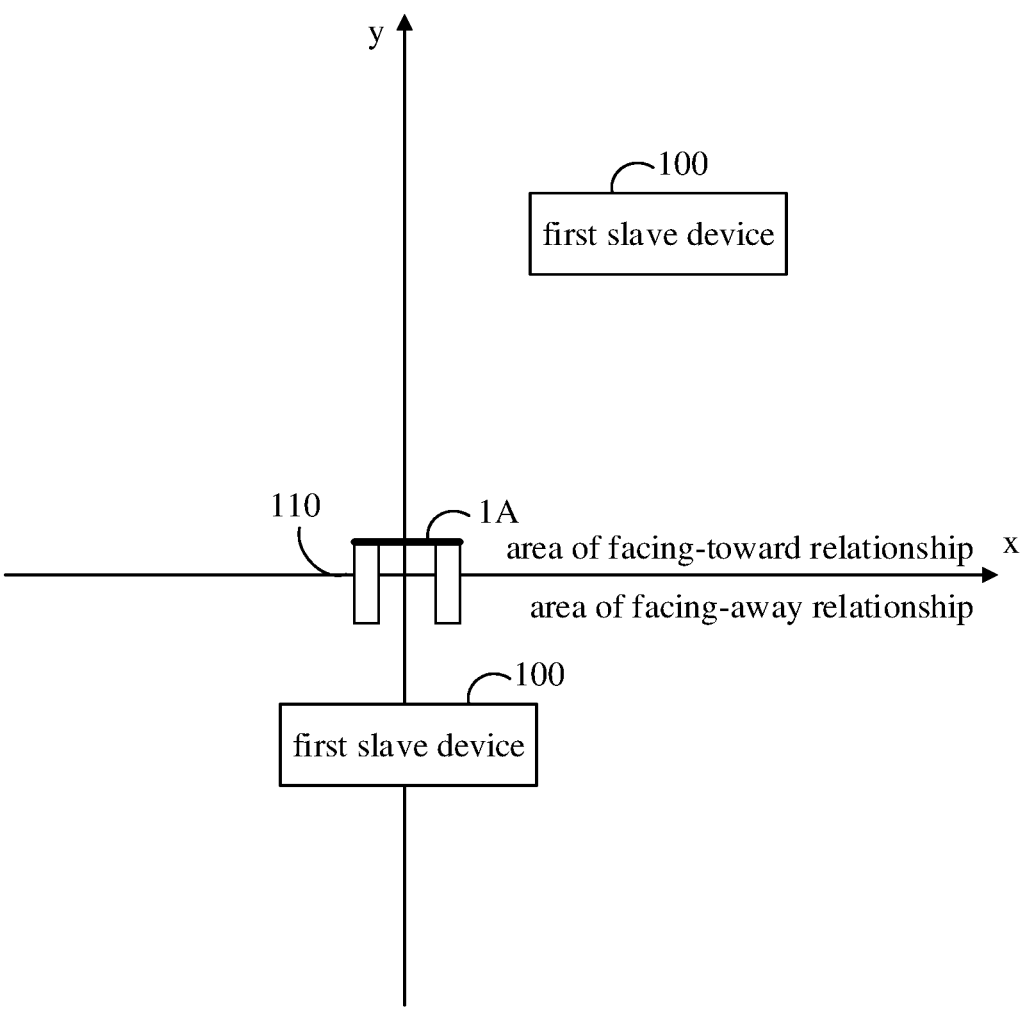
FIG. 1 is a schematic diagram illustrating a relative direction relationship provided by some embodiments of the disclosure.

In order to more clearly illustrate objects, technology solutions and advantages of the disclosure, the embodiments of the disclosure will be further described in detail below in conjunction with the drawings.

When the following description involves the drawings, unless otherwise indicated, the same numerals in different drawings represent the same or similar elements. The implementations described in the following exemplary embodiments do not represent all implementations that are consistent with the disclosure. On the contrary, the implementations are merely examples of apparatuses and methods that are described in detail for the appended claims and that are consistent with some aspects of the disclosure.

In the description of the disclosure, it is notable that terms "first", "second" and the like, are only used for description and cannot be understood as indicating or implying relative importance. In the description of the disclosure, it is notable that, unless otherwise clearly specified and defined, the terms "interconnect" and "connect" should be understood broadly, for example, such terms may mean a fixed connection, a removable connection, or an all-in-one connection; a mechanical connection, or an electrical connection; a direct connection, or an indirect connection through an intermediate medium. For those skilled in the art, the specific meaning of the above-mentioned terms in the disclosure can be understood under specific circumstances. In addition, in the description of the disclosure, unless otherwise specified, the term "multiple" means two or more. The term "and/or" describes an association relationship of associated objects, and indicates that there can be three types of relationships, for example, A and/or B may represent three situations: A exists alone, A and B exist at the same time, and B exists alone. The character "/" generally represents that the associated objects before and after it are in an "or" relationship.

In order to facilitate the understanding of the solutions provided by the embodiments of the disclosure, several terms appearing in the embodiments of the disclosure are introduced below.

Control voice: it refers to a section of voice uttered by a user that is capable of controlling a device to perform a corresponding operation. Specifically, the control voice may include semantic content and non-semantic content. In a possible implementation, the control voice may include a semantic portion, i.e., textual content corresponding to the control voice has an actual linguistic meaning. In another possible implementation, the control voice may include a non-semantic portion, i.e., content corresponding to the control voice does not have an actual linguistic meaning. In this case, the control is performed by means of sound characteristics, such as volume level and tone of voice, that are predefined in the device. In yet another possible implementation, the control voice includes a semantic portion and a non-semantic portion, and a target slave device is capable of recognizing both portions after receiving the control voice.

Wearable device: it refers to an intelligent device worn by the user. In the embodiments of the disclosure, the wearable device may refer to a device of left-right symmetry or left-right asymmetry worn on the user's head. In some embodiments, the wearable device may include at least one of intelligent glasses, intelligent earphones, intelligent earrings, or intelligent collars. When the wearable device is the intelligent earphones, the intelligent earphone may be true wireless stereo (TWS) earphones.

In some embodiments, the wearable device includes a first component and a second component. When a wearer wears the wearable device, the first component is located on the user's left side and the second component is located on the user's right side.

In some embodiments, in a possible implementation, the first component and the second component are independent of each other, where each of the first component and the second component is a physically separate device. For example, when the wearable device is the TWS earphones, the first component is a left earphone of the TWS earphones, and the second component is a right earphone of the TWS earphones. Alternatively, when the wearable device is the intelligent earrings, the first component is a left earring of the intelligent earrings, and the second component is a right earring of the intelligent earrings.

In another possible implementation, the first component and the second component are components arranged in different positions in the same wearable device. For example, when the wearable device is the intelligent glasses, the first component is arranged in a left eyeglass temple, and the second component is arranged in a right eyeglass temple. The first component and the second component are symmetrically arranged about a central axis of the intelligent glasses.

A front face of the wearable device is used to indicate a reference face of the wearable device. In a possible implementation, the front face of the wearable device is a side of the wearable device having a same orientation as the user's face when the wearable device is being worn (in other words, the direction that the user's face faces is perpendicular to the front face of the wearable device); that is, the front face of the wearable device is a side of the wearable device that the user faces toward when the user is wearing the wearable device. In another possible descriptive approach, the front face of the wearable device is a relative concept. When a reference point is specified, the front face of the wearable device relative to the reference point refers to a side where a connection line between the first component and the second component faces the reference point when the first component is located in a clockwise direction of the second component with the reference point as the origin.

Relative direction relationship: it is used to indicate an orientation relationship between the user and the device. Specifically, the orientation relationship between the user's face and a slave device may be defined as a relative direction relationship. When the front face of the user is toward the device, the relative direction relationship is a facing-toward relationship. From another perspective, when the front face of the wearable device faces away from the device, the relative orientation relationship is a facing-away relationship.

In a way of categorizing the relative orientation relationships, a 360-degree range for the direction of the front face of the user may be divided into two 180-degree ranges. One of the two 180-degree ranges indicates the facing-toward relationship, and the other 180-degree range indicates the facing-away relationship.

In another way of categorizing the relative orientation relationships, the 360-degree range for the direction of the front face of the user may be divided into a 180-degree range corresponding to the facing-away relationship, a front 30-degree range corresponding to the facing-toward relationship, and the other 150-degree range corresponding to a side-facing relationship.

FIG. 1 is a schematic diagram illustrating a relative direction relationship provided by some embodiments of the disclosure. The front face of the user is represented by the front face of the wearable device worn by the user, and the device obtains the orientation of the front face of the user by locating the wearable device.

As illustrated in FIG. 1, the front face of a wearable device 110 is 1A. When a first slave device is located in a region of a positive y-axis of a reference coordinate system with a center of the wearable device 110 as an origin, there is a facing-toward relationship between the wearable device 110 and the first slave device 100, and the first slave device 100 is in a facing-toward direction of the user. When the first slave device 100 is located in a region of a negative y-axis of the reference coordinate system with the center of the wearable device 110 as the origin, there is a facing-away relationship between the wearable device 110 and the first slave device 100, and the first slave device 100 is in a facing-away direction of the user.

It is notable that, in FIG. 1, the x-O-y plane of the reference coordinate system is a horizontal plane in the real world.

Figures 2, 3:
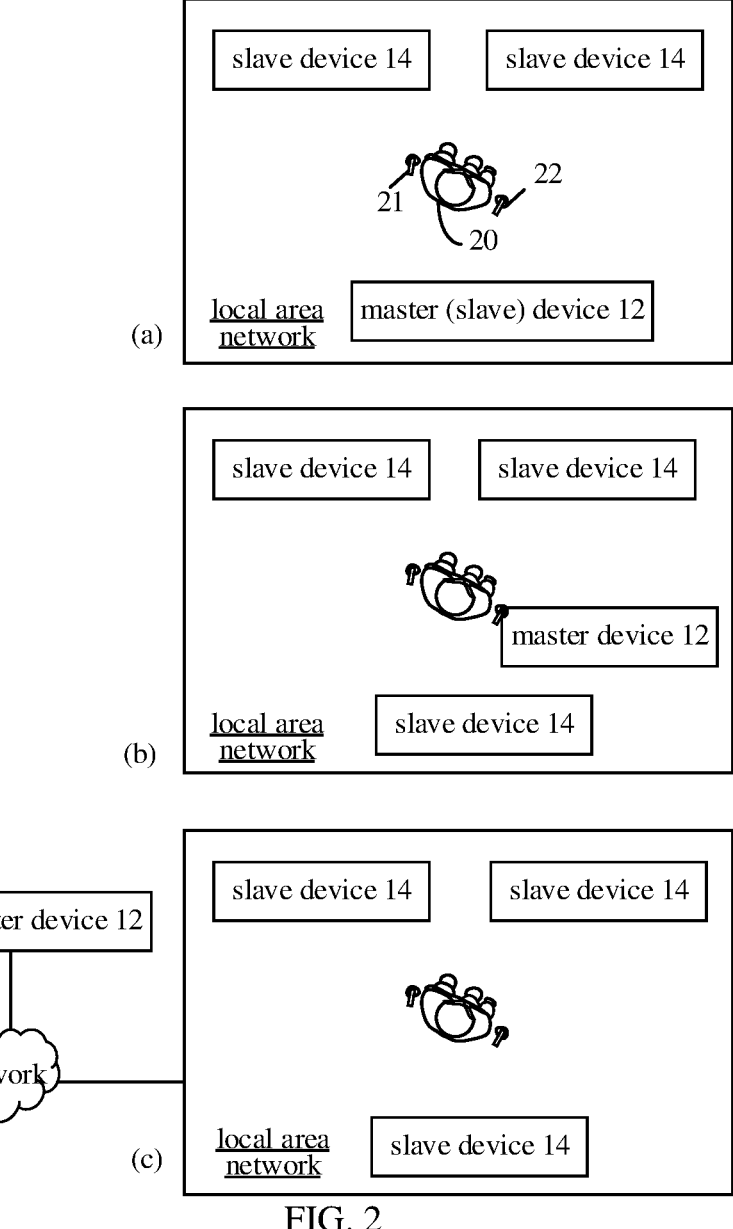
FIG. 2 is a schematic diagram illustrating an application environment to which a method for responding to a control voice provided by some embodiments of the disclosure is applicable.
FIG. 3 is a schematic structural diagram of a device provided by an exemplary embodiment of the disclosure.

FIG. 2 is a schematic structural diagram of a computer system provided by an exemplary embodiment of the disclosure.

FIG. 2 is illustrated from an overhead view, where a direction of the view is from the sky to the ground. In FIG. 2, it is described by taking a case where the wearable device is TWS earphones as an example. A user 20 wears a left earphone 21 of the TWS earphones on the left ear and wears a right earphone 22 of the TWS earphones on the right ear.

There are multiple devices provided in the room as illustrated in FIG. 2. The devices include a master device 12 and slave devices 14. The master device 12 is configured to determine which one of at least two slave devices 14 to make a response to a control voice. The slave devices 14 are configured to respond to the control voice. At least one of the multiple devices is equipped with a microphone, and has a function of capturing the control voice. In some embodiments, one or more of the slave devices 14 are provided with a localization component, and the slave device 14 with the localization component can collect localization information. For example, the localization is performed through an ultra wide band (UWB) technology. Exemplarily, other localization technologies with localization precision at a centimeter level or a millimeter level may also be used.

In part (a) of FIG. 2, three slave devices 14 are provided in the room. And one of the slave devices 14 serves as both the master device 12 and the slave device 14. For example, an intelligent speaker can serve as both the master device 12 and the slave device 14.

In part (b) of FIG. 2, one master device 12 and three slave devices 14 are provided in the room, and the master device 12 is a separate device that is on the same LAN as at least two of the slave devices 14. For example, the master device 12 is a gateway or a cell phone, and the three slave devices 14 are an intelligent speaker, an air conditioner, and a TV. Among them, the air conditioner does not have a voice capture capability, and the intelligent speaker and the TV have a voice capture capability.

In part (c) of FIG. 2, three slave devices 14 are provided in the room, and the three slave devices 14 are connected to a master device 12 located in a cloud server. That is, the master device 12 is a cloud device located on a wide area network. For example, the master device 12 is an intelligent housekeeper service provided by a cloud service, and the three slave devices 14 are an intelligent speaker, an air conditioner, and a TV, respectively.

FIG. 3 is a schematic structural diagram of a device provided by an exemplary embodiment of the disclosure. As illustrated in FIG. 3, the device 300 includes a processor 320, a memory 340, a localization component 360 (optional), and a microphone 380 (optional). The memory 340 stores at least one computer instruction thereon, and the processor 320 loads and executes the computer instruction, to implement the method for responding to a control voice provided by the various method embodiments of the disclosure.

In the disclosure, the device 300 receives a control voice through the microphone 380. The localization component acquires the localization information of the wearable device, in response to the control voice meeting a preset condition.

The device is an intelligent device with a built-in microphone, and can capture, through the microphone, the voice spoken by the user. The microphone of the device may be in a state of continuously performing the listening, to avoid a control instruction spoken by the user from being missed. In some embodiments, the state of performing the listening may be set to be enabled at a certain time period or based on a state of the device itself.

For example, when the state of performing the listening is set to be enabled at a certain time period, the device may set a time period from 7:30 to 22:00 of each day as a listening period, and set a time period from 22:01 of each day to 7:29 of a next day as a non-listening period. The device may respond to a control voice spoken by the user during the listening period; and during the non-listening period, the device turns off the microphone and no longer responds to the control voice spoken by the user.

For example, when the state of performing the listening is set based on the state of the device itself, the device may be in a wake-up state, a standby state, and an offline state (which may also be referred to as a shutdown state). When the device is in the wake-up state or the standby state, the device is in the state of performing the listening. When the device is in the offline state, the device is in a state of not performing the listening.

In some embodiments, the device may be at least one of a Bluetooth speaker, an intelligent TV, an intelligent air conditioner, an intelligent refrigerator, a cleaning robot, an intelligent water heater, an air purifier, or an intelligent lamp. It is notable that the device may be any electronic device that has a microphone and optionally a capability of responding to a user's control voice.

The processor 320 may include one or more processing cores. The processor 102 connects to various parts of the entire device 300 by using various interfaces and lines, and performs various functions of the device 300 and processes data by running or executing an instruction, a program, a code set, or an instruction set stored in the memory 340 and invoking the data stored in the memory 340. In some embodiments, the processor 320 may be implemented by using at least one hardware of a digital signal processor (DSP), a field-programmable gate array (FPGA), and a programmable logic array (PLA). The processor 102 may be integrated with one or a combination of a central processing unit (CPU), a graphics processing unit (GPU), a modem, and the like. The CPU mainly processes an operating system, a user interface, an application program, and the like. The GPU is configured to render and draw content to be displayed on the display. The modem is configured to process wireless communication. It is understood that the modem may not be integrated in the processor 102, but be independently implemented by a communication chip.

The memory 340 may include a random access memory (RAM) or may include a read only memory (ROM). In some embodiments, the memory 340 includes a non-transitory computer-readable storage medium. The memory 340 may be configured to store instructions, programs, codes, code sets, or instruction sets. The memory 340 may include a program storage area and a data storage area. Specifically, the program storage area may store an instruction for implementing an operating system, an instruction for implementing at least one function (for example, a touch function, a sound playback function, and an image playback function), an instruction for implementing the following method embodiments, or the like. The data storage area may further store data involved in the following various method embodiments and the like.

The localization component 360 is configured to determine the localization information with respect to the wearable device. In a possible implementation, the localization information is configured to determine a distance relative to the wearable device and an angle relative to the wearable device. Regarding the principle of implementing the localization, the localization component 360 may adopt the ultra wide band (UWB) technology for localization. Exemplarily, the localization component 360 may further use other localization technologies whose localization precision is at a centimeter level or a millimeter level.

The microphone 380 is configured to receive the user's control voice. In a possible implementation, the microphone 380 may be a separate component. In another possible implementation, the microphone is a microphone array including multiple microphone units. A specific implementation of the microphone 380 is not limited in the embodiments of the disclosure.

In some embodiments, when the device 300 needs to communicate with other devices, a communication component may be provided in the device 300. The communication component is configured to send and receive communication signals. The communication component may include at least one of a Bluetooth component, a Wi-Fi component, a ZigBee component, or a 2.3G/5G signal radio frequency (RF) component. Exemplarily, the communication component may further include other electronic components capable of enabling communication, which is not limited in the embodiments of the disclosure.

Figure 4:
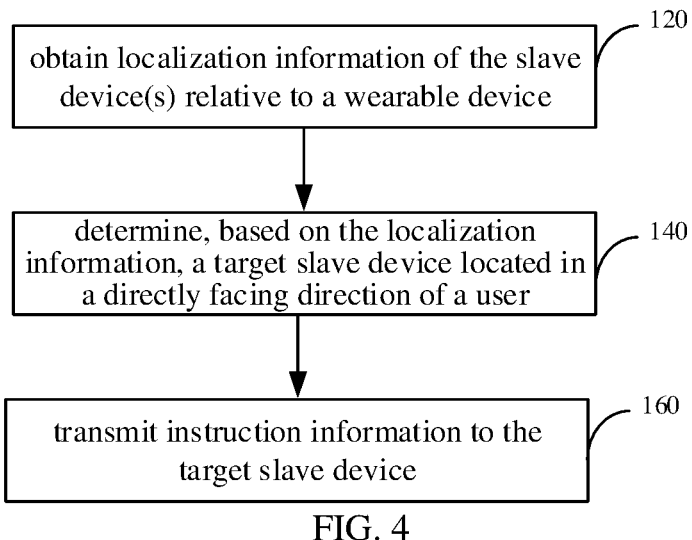
FIG. 4 is a flowchart of the method for responding to a control voice provided by an exemplary embodiment of the disclosure.

FIG. 4 is a flowchart of the method for responding to a control voice as provided by an exemplary embodiment of the disclosure. The method of responding to a control voice may be implemented by a master device illustrated in FIG. 3. The master device communicates with at least two slave devices located in different orientations. The method includes operations as follows.

At operation 120, localization information of the slave device(s) relative to a wearable device is obtained.

The localization information is obtained based on location information of the wearable device that is collected by the slave device through the localization component thereof.

In an exemplary solution, the localization information refers to the location information of the wearable device collected by the slave device through the localization component. Exemplarily, the location information includes but is not limited to a distance between the wearable device and the slave device. In some embodiments, the localization component may be a UWB component, i.e., a localization component designed based on the UWB technology. The localization component itself may have a capability of determining an angle. Alternatively, the localization component may have a capability of localizing coordinates of the wearable device in a coordinate system that is constructed by taking the slave device as an origin. Alternatively, the localization component may have a capability of determining a distance between the wearable device and the slave device and an angle of the wearable device relative to the slave device.

The master device obtains the localization information of at least one of the slave devices. Alternatively, each slave device has a localization capability, and the master device obtains the localization information of each slave device. Alternatively, at least two (or a part) of the slave devices have the localization capability, and the master device obtains the localization information of the at least two slave devices. Alternatively, each slave device has the localization capability and a part of the slave devices may perceive the wearable device, and the master device obtains the localization information of the part of the slave devices. Alternatively, at least two (or a part) of the slave devices have the localization capability and a part of the slave devices may perceive the wearable device, and the master device obtains the localization information of the part of the slave devices.

When the master device is also one of the slave devices, the master device obtains the location information of the wearable device collected by the localization component through internal communication. When the master device is not one of the slave devices, the master device acquires the location information of the wearable device collected by the localization component through network communication.

Alternatively, the slave device may transmit the localization information to the master device through a preset network. The preset network may be a local area network (LAN) in the home, for example, a Wi-Fi LAN provided by a network access point (AP) in the home. In another possible implementation, the preset network may be a network formed by the slave device and other devices through a mobile communication network. For example, the preset network may be a 4G network or a 5G network.

At operation 140, a target slave device located in a directly facing direction of a user is determined based on the localization information.

The target slave device refers to a slave device located in a directly facing direction of the user, that is, a slave device located directly in front of the user.

Exemplarily, the master device determines whether a slave device is located in the directly facing direction of the user, based on the localization information collected by each slave device. The localization information sent by the slave device includes but is not limited to at least one of the distance and the angle between the slave device and the wearable device, and the coordinates of the slave device and the wearable device.

Exemplarily, the master device determines whether a slave device is located in the facing-forward direction of the user, based on the localization information collected by a part of the slave devices. The localization information sent by the slave device includes but is not limited to at least one of the distance and the angle between the slave device and the wearable device, and the coordinates of the slave device and the wearable device.

Exemplarily, the master device may determine the target slave device, based on the localization information sent by at least one of the slave devices and a known topology relationship between the slave devices. The localization information sent by the slave device includes but is not limited to at least one of the distance and the angle between the slave device and the wearable device, and the coordinates of the slave device and the wearable device.

At operation 160, instruction information is transmitted to the target slave device.

In some embodiments, the instruction information refers to control information used to instruct the target slave device to respond to the control voice.

To sum up, in the method for responding to a control voice provided by the illustrated embodiments, the target slave device located in the directly facing direction of the user is determined by obtaining the localization information collected by the slave device(s). The instruction information is transmitted to the target slave device, so as to respond to the user's control voice. With the disclosure, the master device performs the determination based on the localization information collected by the slave device(s), and instructs a correct slave device to make a corresponding response. This reduces the redundant calculation that would be caused when each slave device performs the determination, and avoids a chaotic scenario where more than one slave device responds to the control voice at the same time that is caused due to incorrect determination of the slave device(s). Accordingly, a more efficient method of responding to a control voice is provided.

Figure 5:
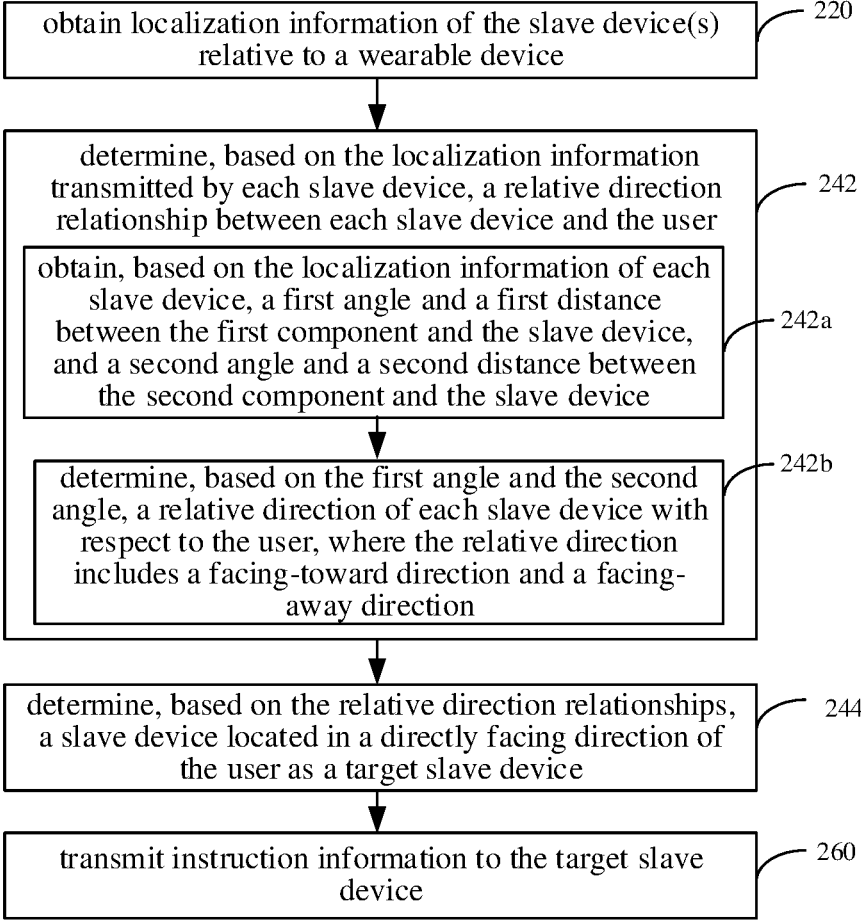
FIG. 5 is another flowchart of the method for responding to a control voice provided by an exemplary embodiment of the disclosure.

FIG. 5 is another flowchart of the method for responding to a control voice as provided by an exemplary embodiment of the disclosure. The method of responding to a control voice may be implemented by a master device illustrated in FIG. 3. The master device communicates with at least two slave devices located in different orientations. The method includes operations as follows.

At operation 220, localization information of the slave device(s) relative to a wearable device is obtained.

For the implementation of this operation, reference may be made to the description of the foregoing operation 120, which will not be repeated here.

Each slave device transmits the localization information of the wearable device to the master device. In some embodiments, after detecting the wearable device, each slave device periodically transmits the localization information of the wearable device to the master device. Alternatively, after listening to the control voice, the slave device transmits control voice information and localization information to the master device simultaneously, and the master device receives the control voice information and the localization information transmitted by each slave device.

At operation 242, a relative direction relationship between each slave device and the user is determined, based on the localization information transmitted by each slave device.

Exemplarily, operation 242 includes sub-operation 242a and sub-operation 242b.

At operation 242a, for each slave device, a first angle and a first distance between the first component and the slave device, and a second angle and a second distance between the second component and the slave device, are obtained based on the localization information of the slave device.

In some embodiments, a wearing state of the wearable device may be determined prior to operation 242a. The master device may agree on a communication protocol with the wearable device in advance, in which a certain digit is designated as a wearable digit. For example, the information sent by the wearable device to the main device includes 8 digits (such as 8 bits), of which the third digit is the wearing digit (which is alternatively referred to as a wearing status indication digit). The wearing digit of 1 indicates that the wearable device is in a worn state. The wearing digit of 0 indicates that the wearable device is in an unworn state.

Exemplarily, the worn state indicates that the wearable device is being worn by the user. For example, the first component is worn on a left side of the user and the second component is worn on a right side of the user, or the intelligent glasses are worn on the user's face, the TWS headphones are worn over the user's ears, or an intelligent neck ring is worn on the user's neck. When the wearable device is in the worn state, the master device can determine the wearing state of the wearable device and obtain the user's localization information based on the wearable device, and there would not be a scenario in which voice control is performed on the target slave device when the user is not wearing the wearable device.

In some embodiments, in response to the wearing state of the wearable device being the worn state, the first angle between the first component and the slave device and the first distance between the first component and the slave device, the second angle between the second component and the slave device, and the second distance between the second component and the slave device, are obtained based on the localization information sent by the slave device.

Figures 6, 7:
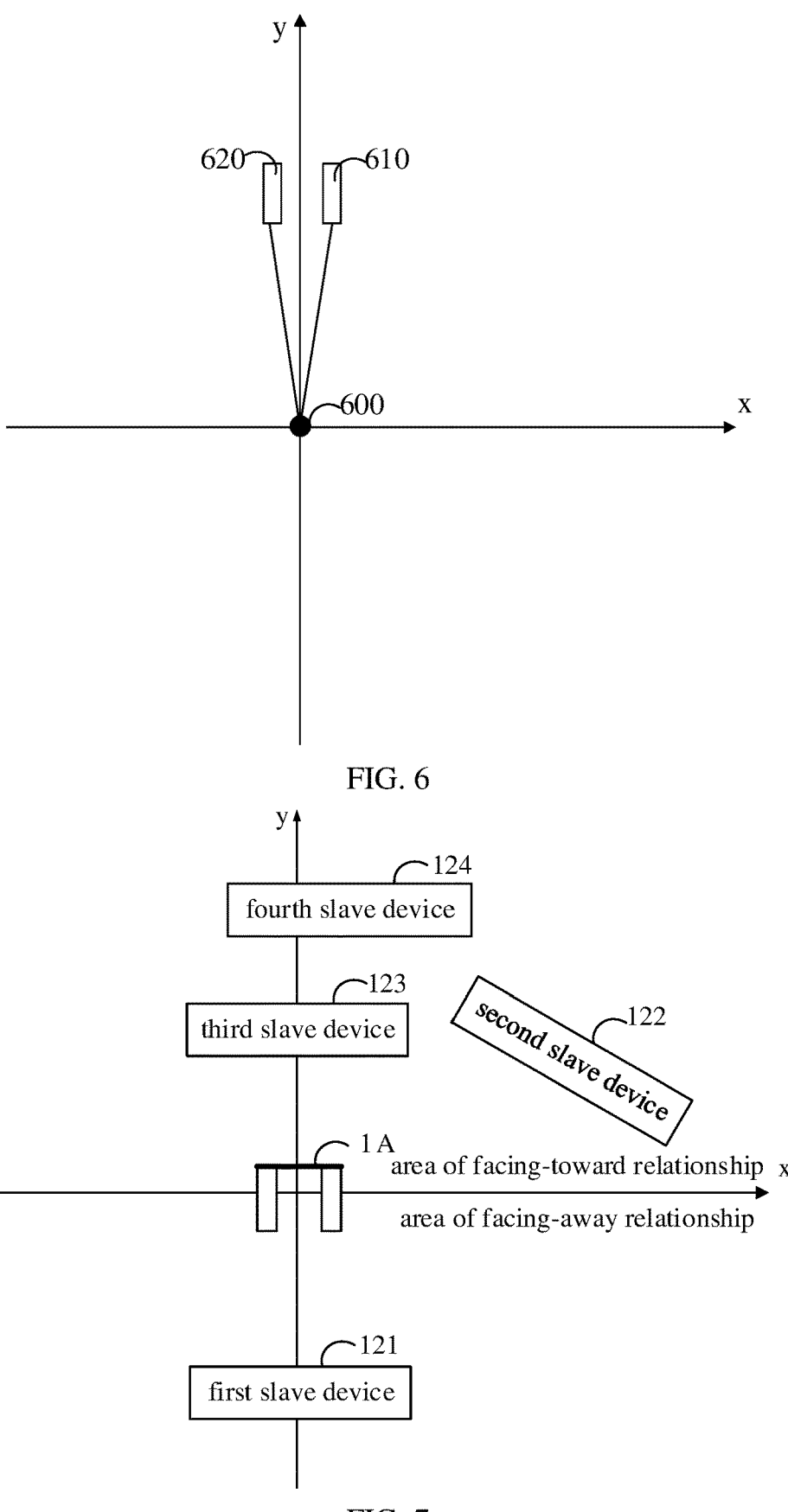
FIG. 6 is a schematic diagram illustrating a projection location relationship based on the embodiment illustrated in FIG. 5.
FIG. 7 is a schematic diagram illustrating an example of responding to a control voice based on the embodiment illustrated in FIG. 5.

As illustrated in FIG. 6, the first angle refers to an angle of the first component 610 relative to the slave device 600. For example, when a coordinate system is constructed by taking the slave device 600 as an origin, a directly facing direction of the slave device 600 as a positive y-axis, and a right side of the slave device as a positive x-axis, the first angle is an angle between the positive x-axis and a connection line between the first component 610 and the slave device 600.

Illustratively, the second angle is an angle of the second component 620 relative to the slave device 600. For example, when a coordinate system is constructed by taking the slave device 600 as the origin, the directly facing direction of the slave device 600 as the positive y-axis, and the right side of the slave device 600 as the positive x-axis, the second angle is an angle between the positive x-axis and a connection line between the second component 620 and the slave device 600.

The first distance is a distance between the first component and the slave device, and the second distance is a distance between the second component and the slave device.

At operation 242b, a relative direction of each slave device with respect to the user is determined, based on the first angle and the second angle, where the relative direction includes a facing-toward direction and a facing-away direction.

When the first angle is less than the second angle, the slave device is in the facing-toward direction of the user. When the first angle is greater than the second angle, the slave device is in the facing-away direction of the user.

At operation 244, a slave device located in a directly facing direction of the user is determined as a target slave device, based on the relative direction relationships.

Exemplarily, based on the relative direction relationships, the terminal determines, as the target slave device, a slave device that is located in the facing-toward direction of the user and has the smallest distance difference.

The terminal selects slave devices located in the facing-toward direction of the user, compares distance differences of the selected slave devices, and determines a slave device whose distance difference is the smallest as the target slave device, where the distance difference of each selected slave device is a distance difference between the first distance and the second distance of this selected slave device.

Exemplarily, as illustrated in FIG. 7, the user is taken as a reference point, and a thick solid line 1A in FIG. 7 represents the front face of the wearable device. There are four slave devices in the environment, namely a first slave device 121, a second slave device 122, a third slave device 123, and a fourth slave device 124. The relative direction relationship between the user and each slave device is determined by comparing the first angle of the slave device with the second angle of the slave device. Based on this, it is known that the second slave device 122, the third slave device 123, and the fourth slave device 124 are located in the facing-toward direction of the user, and the first slave device 121 is located in the facing-away direction of the user. Then, the distance differences of the second slave device 122, the third slave device 123 and the fourth slave device 124 are compared, where the distance difference of each of these slave devices is a distance difference between the first distance and the second distance of the slave device. The third slave device 123 having the smallest distance difference is selected as the target slave device.

At operation 260, instruction information is transmitted to the target slave device.

The instruction information refers to control information used to instruct the target slave device to respond to the control voice.

In a possible implementation, the master device may transmit the instruction information carrying control voice information to the target slave device. The control voice information may be obtained based on the control voice captured by the master device or the slave device through a microphone.

Exemplarily, the control voice information is generated based on the control voice collected by the master device or the slave device. For example, the control voice information is a text result obtained by performing voice-to-text conversion on the control voice. For another example, the control voice information is a keyword extracted from the control voice. For yet another example, the control voice information is a control instruction obtained by mapping the control voice.

Exemplarily, the control voice information may be captured by the master device. For example, the master device is one slave device with a microphone among the multiple slave devices located in the implementation environment. For another example, the master device is a separate device with a voice capture function in the implementation environment. The control voice information may also be captured by the slave device. For example, a slave device with a microphone captures a user's control voice, and the slave device may choose to transmit the captured control voice to the master device.

Exemplarily, when the target slave device is equipped with a microphone, the master device transmits the instruction information to the target slave device, in which the instruction information is used to instruct the target slave device to recognize the control voice and perform a corresponding operation based on the control voice information. When the target slave device is not equipped with the microphone, the instruction information further carries a control instruction obtained by mapping the control voice information, in which the control instruction is used to instruct the target slave device to perform an operation corresponding to the control voice.

Exemplarily, when the target slave device is an intelligent speaker equipped with a microphone, in response to the control voice captured by the intelligent speaker being an inquiry voice, the master device transmits, to the target slave device, i.e., the intelligent speaker, the instruction information to instruct the intelligent speaker to recognize and response to the control voice information. For example, in a case where the intelligent speaker captures a user's control voice about inquiring today's weather condition, after the master device determines the intelligent speaker as the target slave device, the master device transmits, to the intelligent speaker, the instruction information to instruct the intelligent speaker to recognize and response to the control voice information. The intelligent speaker obtains a reply text about the weather condition, generates a reply voice and plays the reply voice.

Exemplarily, when the target slave device is the intelligent speaker equipped with the microphone, in response to the control voice captured by the intelligent speaker being a wake-up voice, the master device transmits, to the target slave device, i.e., the intelligent speaker, the instruction information to instruct the intelligent speaker to recognize and response to the control voice information. When the intelligent speaker recognizes a specific wake-up word contained in the control voice, the intelligent speaker enters a power-on mode.

Exemplarily, when the target slave device is an intelligent air conditioner without a microphone, the master device is a separate device with a voice capture function in the implementation environment, such as a user's mobile phone. In response to the control voice captured by the master device indicating an actual preset operation, the master device transmits an operating instruction corresponding to the control voice to the target slave device. For example, when the control voice indicates an operation of turning on the air conditioner, the master device transmits, upon capturing the control voice, an instruction of turning on the air conditioner to the target air conditioner.

Exemplarily, when the target slave device is an intelligent air conditioner without a microphone, there is another slave device with a microphone in the implementation environment. The another slave device transmits the captured control voice to the master device. In response to the control voice received by the master device indicating an actual preset operation, the master device transmits an operating instruction corresponding to the control voice to the target slave device. For example, when the control voice indicates an operation of turning on the air conditioner, a smart speaker with a microphone in the implementation environment captures the control voice information, and transmits the control voice information to the master device, so that an instruction of turning on the air conditioner is transmitted to the target air conditioner.

Exemplarily, the master device in the implementation environment periodically acquires the localization information of the wearable device that is collected by the slave device(s). When it is determined that the target slave device is a slave device with a microphone, the master device transmits, to the target slave device, instruction information to instruct the target slave device to recognize and respond to the control voice.

Based on the above, in the method of responding to a control voice as provided by the illustrated embodiments, the direction relationship and the angle relationship between each slave device and each of the first component and the second component are obtained. Thereafter, the relative direction relationship between each slave device and the user is determined, and by performing comparison among the slave devices in term of the distance difference between the first distance and the second distance, a slave device with the smallest distance difference is determined as the target slave device. With this method, the target slave device can be determined through the master device, which reduces the repeated calculation of each slave device; also, based on the localization information of the two components of the wearable device, the relative direction relationship between the user and each slave device can be more accurately obtained, and a slave device closest to the directly facing direction of the user can be selected as the target slave device, which improves the accuracy of selecting the target slave device.

Figure 8:
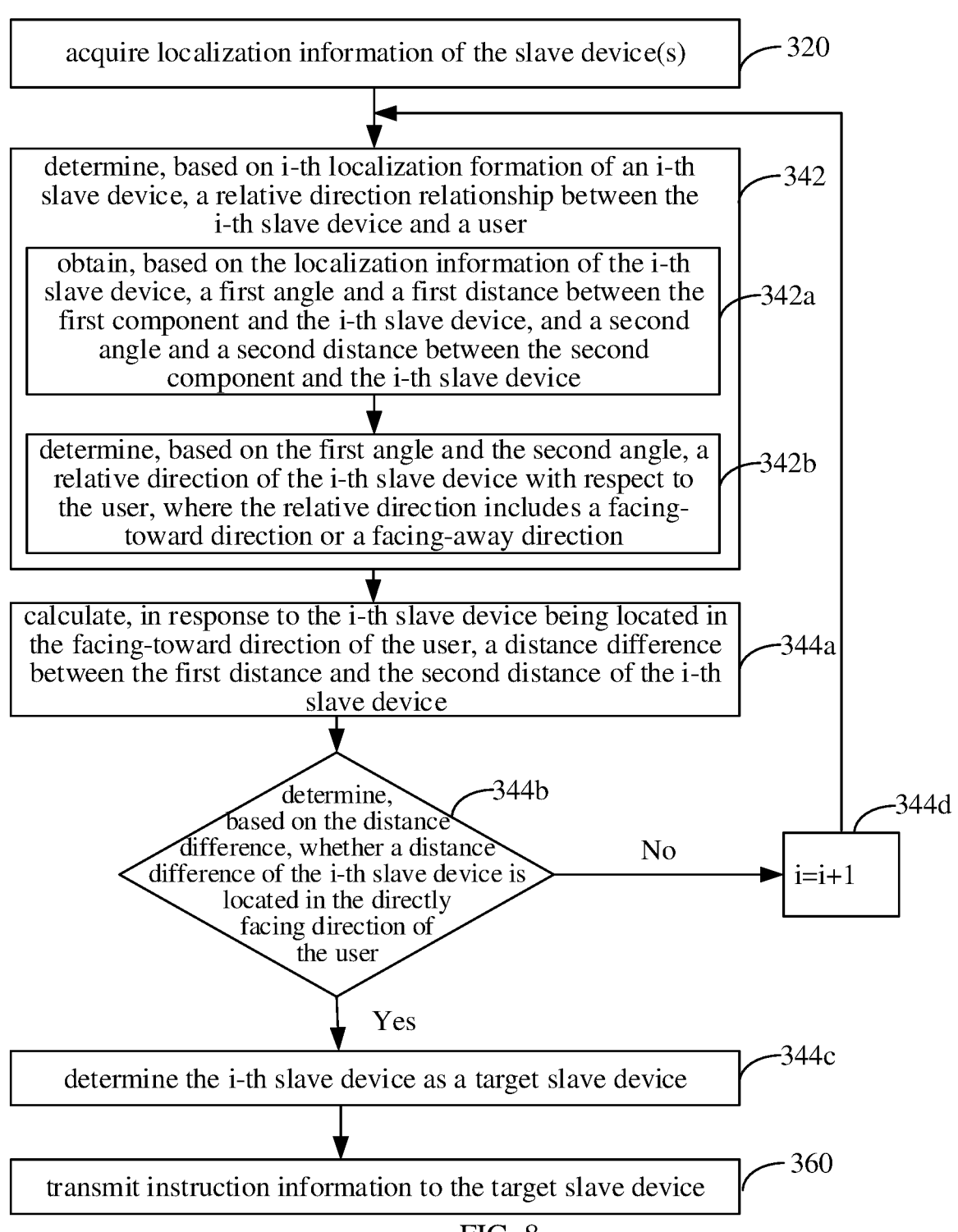
FIG. 8 is yet another flowchart of the method for responding to a control voice provided by an exemplary embodiment of the disclosure.

FIG. 8 is yet another flowchart of the method for responding to a control voice as provided by an exemplary embodiment of the disclosure. The method of responding to a control voice may be implemented by a master device illustrated in FIG. 3. The master device communicates with at least two slave devices located in different orientations. The method includes operations as follows.

At operation 320, localization information of the slave device(s) is acquired.

For the implementation of this operation, reference may be made to the description of the foregoing operation 220, which will not be repeated here.

At operation 342, a relative direction relationship between an i-th slave device and a user is determined based on i-th localization formation of the i-th slave device, where i is a positive integer and is less than or equal to the number of the at least two slave devices.

The master device sorts the slave devices based on a receiving order of the localization information of the multiple slave devices. The following sub-operations are executed starting from a first one of the slave devices.

At operation 342a, a first angle and a first distance between the first component and the i-th slave device, and a second angle and a second distance between the second component and the i-th slave device, are obtained based on the localization information of the i-th slave device.

Exemplarily, as illustrated in FIG. 6, the first angle refers to an angle of the first component relative to the slave device. For example, when a coordinate system is constructed by taking the slave device as an origin, a directly facing direction of the slave device as a positive y-axis, and a right side of the slave device as a positive x-axis, the first angle is an angle between the positive x-axis and a connection line between the first component and the slave device.

Illustratively, the second angle is an angle of the second component relative to the slave device. For example, when a coordinate system is constructed by taking the slave device as an origin, a directly facing direction of the slave device as a positive y-axis, and a right side of the slave device as a positive x-axis, the second angle is an angle between the positive x-axis and a connection line between the second component and the slave device.

The first distance is a distance between the first component and the slave device, and the second distance is a distance between the second component and the slave device.

In some embodiments, in response to the wearing state of the wearable device being the worn state, based on the localization information transmitted by the slave device, the first angle between the first component and the slave device, the first distance between the first component and the slave device, the second angle between the second component and the slave device, and the second distance between the second component and the slave device are obtained. For the implementation of this operation, reference may be made to the description of the foregoing operation 242a, which will not be repeated here.

At operation 342b, a relative direction of the i-th slave device with respect to the user is determined based on the first angle and the second angle, where the relative direction includes a facing-toward direction or a facing-away direction.

When a coordinate system is constructed by taking the slave device as the origin, the directly facing direction of the slave device as the positive y-axis, and the right side of the slave device as the positive x-axis, the first angle is the angle between the positive x-axis and the connection line between the first component and the slave device, and the second angle is the angle between the positive x-axis and the connection line between the second component and the slave device.

When the first angle is less than the second angle, the slave device is in the facing-toward direction of the user. When the first angle is greater than the second angle, the slave device is in the facing-away direction of the user.

At operation 344a, a distance difference between the first distance and the second distance of the i-th slave device is calculated, in response to the i-th slave device being located in the facing-toward direction of the user.

At operation 344b, it is determined, based on the distance difference, whether the i-th slave device is located in the directly facing direction of the user.

A predetermined threshold, such as 0.5 centimeter, 1 centimeter, or 2 centimeters, is preset for the distance difference between the first distance and the second distance of the slave device.

When the distance difference between the first distance and the second distance of the i-th slave device is less than the predetermined threshold, it is determined that the i-th slave device is located in the directly facing direction of the user. When the distance difference between the first distance and the second distance of the i-th slave device is greater than the predetermined threshold, it is determined that the i-th slave device is not located in the directly facing direction of the user.

At operation 344c, the i-th slave device is determined as a target slave device, when the i-th slave device is located in the directly facing direction of the user.

In daily scenarios, it is rare that more than one slave device located in the directly facing direction of the user at the same time. Therefore, when the master device determines that the relative direction relationship of the i-th slave device indicates that the i-th slave device is located in the directly facing direction of the user, the i-th slave device may be determined as the target slave device, and there is no need to perform calculation and determination on the remaining slave devices.

At operation 344*d*, it proceeds to operation 342 after incrementing i by 1, when the i-th slave device is not located in the directly facing direction of the user.

Figure 9:
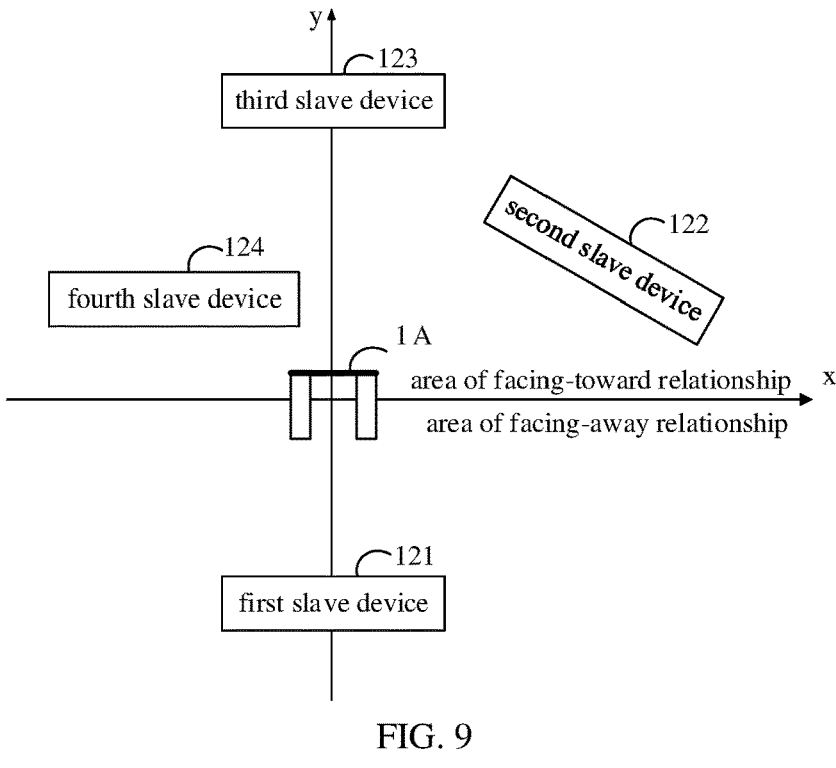
FIG. 9 is another schematic diagram illustrating an example of responding to a control voice based on the embodiment illustrated in FIG. 8.

Exemplarily, as illustrated in FIG. 9, there are at least four slave devices in the environment, and the predetermined threshold is set as 1 centimeter. The master device acquires the localization information collected by each slave device. The master device obtains the first angle and the second angle of the first slave device 121, based on the localization information of the first slave device 121. Since the first angle of the first slave device 121 is greater than the second angle of the first slave device 121, it is determined that the first slave device 121 is in the facing-away direction of the user, and the distance difference between the first distance and the second distance of the first slave device dose not be further considered. The master device obtains the first angle and the second angle of the second slave device 122, based on the localization information of the second slave device 122. Since the first angle of the second slave device 122 is less than the second angle of the second slave device 122, it is determined that the second slave device 122 is in the facing-toward direction of the user. Based on the distance difference between the first distance and the second distance of the second slave device 122 being greater than 1 centimeter, it is further determined that the second slave device 122 is not located in the directly facing direction of the user. The master device obtains the first angle and the second angle of the third slave device 123, based on the localization information of the third slave device 123. Since the first angle of the third slave device 123 is less than the second angle of the third slave device 123, it is determined that the third slave device 123 is in the facing-toward direction of the user. Based on the distance difference between the first distance and the second distance of the third slave device 123 being less than 1 centimeter, it is further determined that the third slave device 123 is located in the directly facing direction of the user. The master determines the third slave device 123 as the target slave device, and no longer performs localization calculation and determination on the localization information of the fourth slave device 124 and other devices that may exist in the environment.

At operation 360, instruction information is transmitted to the target slave device.

For the implementation of this operation, reference may be made to the description of the foregoing operation 260, which will not be repeated here.

To sum up, in the method for responding to a control voice as provided by the illustrated embodiments, the voice control information and localization information transmitted by the slave device are received, and the relative direction relationship between the slave device and the user is determined. In addition, the determination is no longer performed on the next slave device after the target slave device is found. The method further reduces redundant calculations and improves the response speed of the target slave device, when there are a large number of slave devices in the environment.

Figure 10:
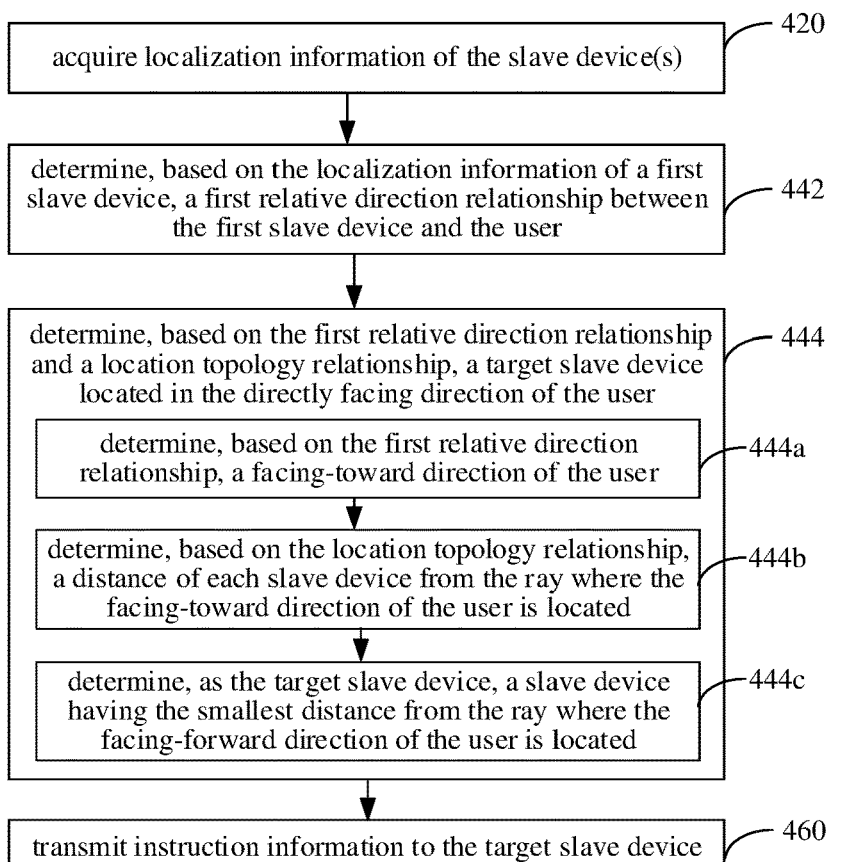
FIG. 10 is still yet another flowchart of the method for responding to a control voice provided by an exemplary embodiment of the disclosure.

FIG. 10 is still yet another flowchart of the method for responding to a control voice as provided by an exemplary embodiment of the disclosure. A master device of the embodiment stores a location topology relationship of at least two slave devices. The method for responding to a control voice may be implemented by a master device illustrated in FIG. 3. Such method for responding to a control voice includes operations as follows.

At operation 420, localization information of the slave device(s) is acquired.

For the implementation of this operation, reference may be made to the description of the foregoing operation 220, which will not be repeated here.

In the illustrated embodiments, it is assumed that only a part of the slave devices has a localization capability, and the master device acquires the localization information of the part of the slave devices. Hereinafter, the slave device with the localization capability is referred to as a first slave device, which is one or more of all the slave devices. The master device obtains the localization information of the first slave device.

In the illustrated embodiments, it is also assumed that the master device stores a location topology relationship between the individual slave devices. For example, the location topology relationship is represented by coordinates of each slave device in a plane coordinate system constructed with the first slave device as an origin.

At operation 442, a first relative direction relationship between the first slave device and the user is determined based on the localization information of the first slave device.

For the first slave device, first coordinates of the first component relative to the first slave device and second coordinates of the second component relative to the first slave device are obtained based on the localization information collected by the first slave device. The first relative direction relationship between the first slave device and the user is determined, based on the first coordinates and the second coordinates.

Exemplarily, in the planar coordinate system constructed with the first slave device as the origin, the first relative direction relationship is represented by a relative direction relationship between the origin and the first coordinates of the first component in the planar coordinate system, and a relative direction relationship between the origin and the second coordinates of the second component in the planar coordinate system.

At operation 444, a target slave device located in the directly facing direction of the user is determined, based on the first relative direction relationship and the location topology relationship.

Exemplarily, operation 444 at least includes sub-operations as follows.

At operation 444*a*, a facing-toward direction of the user is determined, based on the first relative direction relationship.

Figure 11:
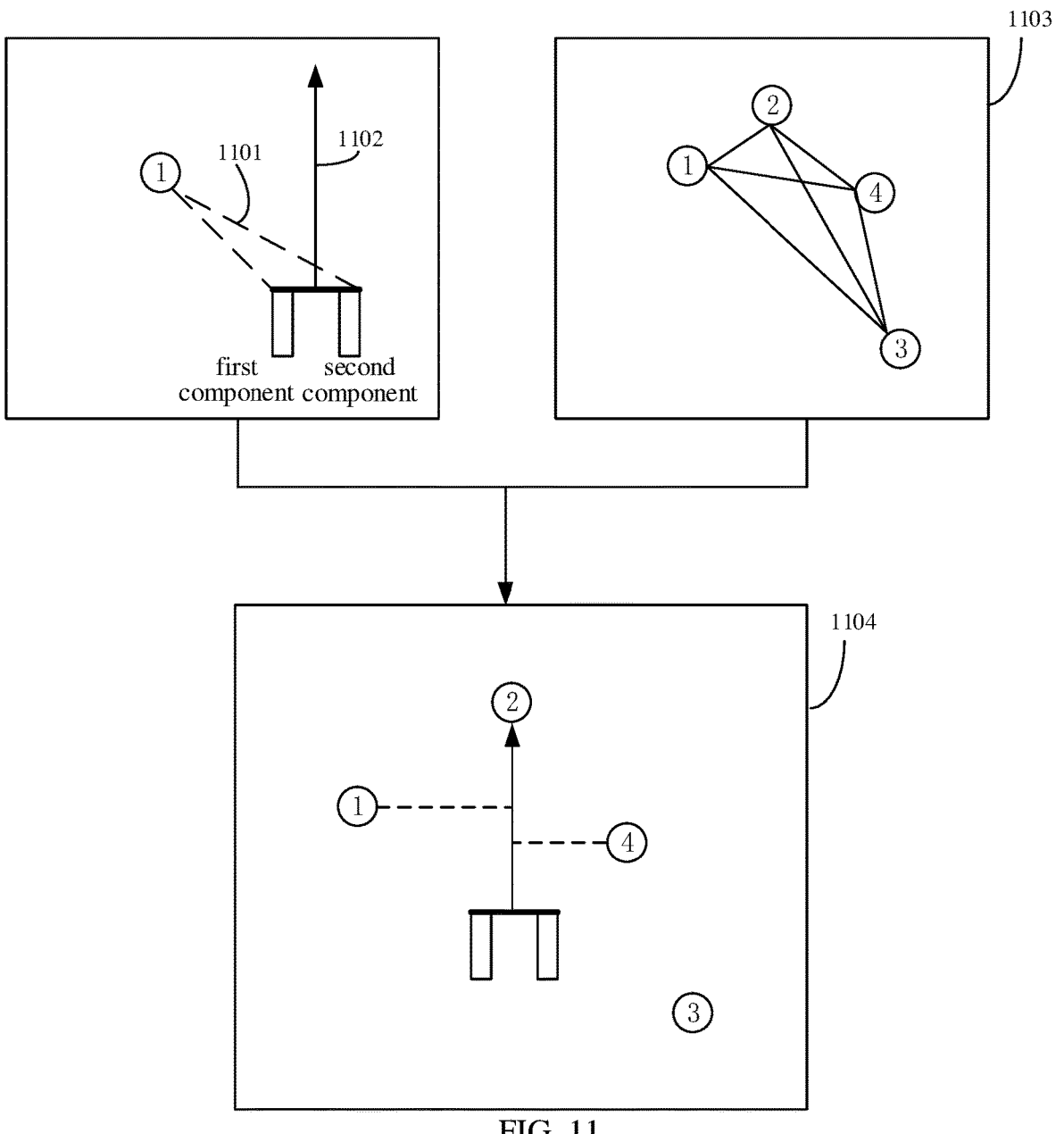
FIG. 11 is yet another schematic diagram illustrating an example of responding to a control voice based on the embodiment illustrated in FIG. 10.

Based on the first relative direction relationship, a ray is made, which is perpendicular to a connection line segment between the first coordinates and the second coordinates at a midpoint of the connection line segment, and a direction of the ray points to the facing-toward direction of the user. That is, the ray passes through the midpoint of the first coordinates and the second coordinates, the first component is located on the left side of the ray, and the second component is located on the right side of the ray. As illustrated in FIG. 11, dotted lines 1101 represent the first relative direction relationship obtained for the first slave device 1, and a ray 1102 represents the facing-toward direction of the user.

At operation 444*b*, a distance of each slave device from the ray where the facing-toward direction of the user is located is determined based on the location topology relationship.

A topology map 1103 in FIG. 11 represents the location topology relationship of the at least two slave devices that is pre-stored in the master devices, in which it is illustrated by taking a case where there are four slave devices in the environment as an example. Based on the location topology relationship and in combination with the facing-toward direction of the user obtained in operation 432, a vertical line segment is made from each slave device to the ray where the facing-toward direction of the user is located, and the length of the vertical line segment is the distance of the slave device from the ray where the facing-forward direction of the user is located.

At operation 444c, a slave device having the smallest distance from the ray where the facing-forward direction of the user is located is determined as the target slave device.

As illustrated in 1104 of the figure, the slave device 2 has the smallest distance from the ray where the facing-toward direction of the user is located, and the slave device 2 is determined as the target slave device.

At operation 460, instruction information is transmitted to the target slave device.

For the implementation of this process, reference may be made to the description of the foregoing operation 260, which will not be repeated here.

To sum up, in the method provided in the illustrated embodiments, the master device pre-stores the location topology relationship of the at least two slave devices. On this basis, the master device can determine the target slave device, only by further combining the localization information transmitted by the first slave device. As such, this greatly reduces the calculation of sequentially determining whether each slave device is located in the directly facing direction of the user, and provides a more efficient way of responding to a control voice.

The following are apparatus embodiments of the disclosure, which may be used to execute the method embodiments of the disclosure. For details not disclosed in the apparatus embodiments of the disclosure, reference may be made to the method embodiments of the disclosure.

Figure 12:
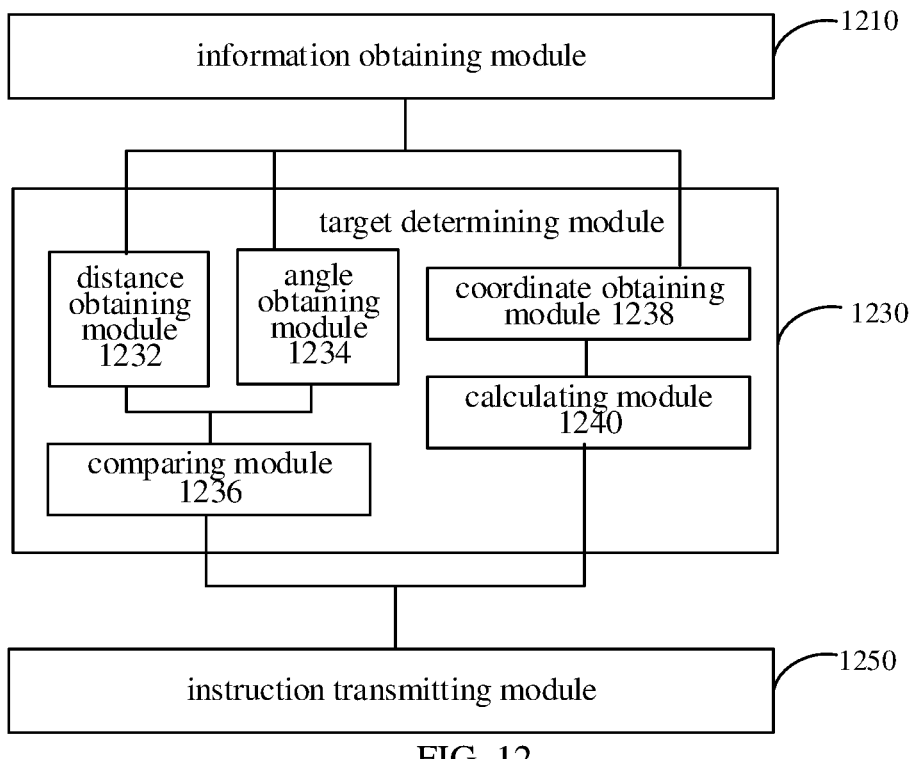
FIG. 12 is a structural block diagram of an apparatus for responding to a control voice provided by an exemplary embodiment of the disclosure.

FIG. 12 is a structural block diagram of an apparatus for responding to a control voice as provided by an exemplary embodiment of the disclosure. The apparatus for responding to a control voice may be implemented as an entire terminal or a part of a terminal through software, hardware, or a combination of software and hardware. The apparatus includes an information obtaining module 1210, a target determining module 1230 and an instruction transmitting module 1250.

The information obtaining module 1210 is configured to obtain localization information of slave device(s) relative to a wearable device, where the localization information of each slave device is obtained based on location information of the wearable device collected by the slave device through a localization component.

The target determining module 1230 is configured to determine, based on the localization information, a target slave device located in a directly facing direction of a user, where the user is wearing the wearable device.

The instruction transmitting module 1250 is configured to transmit instruction information to the target slave device, where the instruction information is configured to instruct the target slave device to respond to the control voice.

In a possible design, the target determining module 1230 is configured to: determine, based on the localization information of each slave device, a relative direction relationship between the slave device and the user; and determine, based on the relative direction relationships, a slave device located in a directly facing direction of the user as the target slave device.

In a possible design, the wearable device includes a first component and a second component, the first component is worn on a left side of the user and the second component is worn on a right side of the user. The target determining module 1230 includes a distance obtaining module 1232, an angle obtaining module 1234 and a comparing module 1236.

The distance obtaining module 1232 is configured to: for each slave device, obtain, based on the localization information of the slave device, a first distance between the first component and the slave device, and a second distance between the second component and the slave device. The angle obtaining module 1234 is configured to: for each slave device, obtain, based on the localization information of the slave device, a first angle between the first component and the slave device, and a second angle between the second component and the slave device. The comparing module 1236 is configured to: determine, based on the first angle and the second angle, a relative direction of each slave device with respect to the user, in which the relative direction includes a facing-toward direction or a facing-away direction.

The comparing module 1236 is further configured to: calculate a distance difference between the first distance and the second distance, and determine, as the target slave device, a slave device that is located in the facing-toward direction of the user and has the smallest distance difference.

In a possible design, the target determining module 1230 is further configured to: determine, based on i-th localization information of an i-th slave device, the relative direction relationship between the i-th slave device and the user, where i is a positive integer; in response to the relative direction relationship indicating that the i-th slave device is located in the directly facing direction of the user, determine the i-th slave device as the target slave device; and in response to the relative direction relationship indicating that the i-th slave device is not located in the directly facing direction of the user, increment i by 1 and proceed to the operation of determining, based on i-th localization information of the i-th slave device, the relative direction relationship between the i-th slave device and the user.

In a possible design, the wearable device comprises a first component and a second component, the first component is worn on a left side of the user and the second component is worn on a right side of the user. The target determining module 1230 includes a distance obtaining module 1232, an angle obtaining module 1234 and a comparing module 1236.

The distance obtaining module 1232 is configured to: obtain, based on the localization information of the i-th slave device, a first distance between the first component and the i-th slave device, and a second distance between the second component and the i-th slave device. The angle obtaining module 1234 is configured to: obtain, based on the localization information of the i-th slave device, a first angle between the first component and the i-th slave device, and a second angle between the second component and the i-th slave device. The comparing module 1236 is configured to: determine, based on the first angle and the second angle, a relative direction of the i-th slave device with respect to the user, where the relative direction includes a facing-toward direction or a facing-away direction.

The comparing module 1236 is further configured to: calculate a distance difference between the first distance and the second distance; and determine the i-th slave device as the target slave device, in response to the i-th slave device being located in the facing-toward direction of the user and the distance difference of the i-th slave device being less than a preset threshold.

In a possible design, the master device stores a location topology relationship of the at least two slave devices.

The target determining module 1230 is further configured to: determine, based on the localization information transmitted by a first slave device, a first relative direction relationship between the first slave device and the user; and determine, based on the first relative direction relationship and the location topology relationship, the target slave device located in the facing-toward direction of the user.

In a possible design, the wearable device includes a first component and a second component, the first component is worn on a left side of the user and the second component is worn on a right side of the user. The target determining module 1230 includes a coordinate obtaining module 1238 and a calculating module 1240.

The coordinate obtaining module 1236 is configured to: for the first slave device, obtain, based on the localization information transmitted by the first slave device, first coordinates of the first component relative to the first slave device, and second coordinates of the second slave component relative to the first component. The calculating module 1240 is configured to determine, based on the first coordinates and the second coordinates, the first relative direction relationship between the first slave device and the user.

In a possible design, the calculating module 1240 is configured to: determine, based on the first relative direction relationship, a facing-toward direction of the user; determine, based on the location topology relationship, a distance of each slave device from a ray where the facing-toward direction of the user is located; and determine, as the target slave device, a slave device having the smallest distance from the ray where the facing-toward direction of the user is located.

In a possible design, the instruction transmitting module 1250 is configured to: transmit the instruction information carrying control voice information to the target slave device, in which the control voice information is obtained based on the control voice collected by the master device or the slave device through a microphone.

In a possible design, the master device is also one of the at least two slave devices; or the master device is a separate device from the at least two slave devices and is on a same local area network as the at least two slave devices; or the master device is a cloud device located on a wide area network.

The embodiments of the disclosure further provide a non-transitory computer-readable storage medium. The computer-readable storage medium stores at least one instruction which, when being loaded and executed by the processor, cause the method for responding to a control voice described in the above embodiments to be implemented.

The embodiments of the disclosure further provide a computer program product. The computer program product includes computer instructions stored in a computer-readable storage medium. A processor of a computer device reads the computer instructions from the computer-readable storage medium. The processor executes the computer instructions to cause the computer device to implement the method for responding to a control voice provided by the various embodiments of the disclosure.

The embodiments of the disclosure further provide a computer program including computer instructions. A processor of a computer device executes the computer instructions, to cause the computer device to implement the method for responding to a control voice provided by the various embodiments of the disclosure.

In the embodiments of the disclosure, a master device obtains localization information of at least two slave devices, and determines, based on the localization information, a target slave device located in the directly facing direction of the user. And the target slave device responds to the control voice. On the one hand, the chaotic scenario where multiple slave devices respond to the control voice at the same time is avoided; and on the other hand, only the master device is responsible for localization calculation, which can reduce the amount of computation compared with a case where each of the multiple slave devices performs the localization calculation by itself, and avoid a waste of resources caused by repeated computation.

It is notable that, when the apparatus for responding to a control voice provided in the foregoing embodiments implements the method for responding to a control voice, the division of the foregoing functional modules is merely an example for description. In the practical application, the functions may be assigned to and completed by different functional modules as required, that is, the internal structure of the device is divided into different functional modules, to implement all or some of the functions described above. In addition, the apparatus for responding to a control voice provided in the foregoing embodiments and the embodiments of the method for responding to a control voice belong to the same concept. For the specific implementation process, reference is made to the method embodiments, and details are not described herein again.

The foregoing numbers used for the embodiments of the disclosure are merely for description purpose, but do not imply the preference among the embodiments.

Those skilled in the art can understand that all or part of the operations for implementing the above embodiments may be completed by hardware, or may be completed by instructing relevant hardware through a program. The program may be stored in a computer-readable storage medium. The storage medium mentioned may be a read-only memory (ROM), a magnetic disk or an optical disk, etc.

What is claimed is:

1. A method for responding to a control voice, wherein the method is implemented by a master device that communicates with at least two slave devices located in different orientations, and the method comprises:

obtaining localization information of each of the at least two slave devices relative to a wearable device, wherein the location information of each of the at least two slave devices is obtained based on location information of the wearable device collected by the slave device through a localization component;

determining, based on the localization information of each of the at least two slave devices, a relative direction relationship between the each of the at least two slave devices and a user, and determining, based on the relative direction relationships of the at least two slave devices, a slave device located in a directly facing direction of the user as a target slave device, wherein the user is wearing the wearable device; and transmitting instruction information to the target slave device, wherein the instruction information is configured to instruct the target slave device to respond to the control voice;

wherein the wearable device comprises a first component and a second component, the first component is worn on a left side of the user and the second component is worn on a right side of the user; and the determining, based on the localization information of each of the at least two slave devices, a relative direction relationship between the each of the at least two slave devices and the user, comprises:

for the each of the at least two slave devices, constructing, based on the localization information of the slave device, a coordinate system by taking the slave device as an origin, a directly facing direction of the slave device as a positive y-axis, and a right side of the slave device as a positive x-axis;

determining a first angle between the positive x-axis and a connection line between the first component and the slave device, and determining a second angle between the positive x-axis and a connection line between the second component and the slave device; and determining, based on the first angle and the second angle, a relative direction of the slave device with respect to the user, wherein the relative direction comprises a facing-toward direction or a facing-away direction.

2. The method as claimed in claim 1, wherein the determining, based on the localization information of each of the at least two slave devices, a relative direction relationship between the each of the at least two slave devices and the user, further comprises:

for the each of the at least two slave devices, obtaining a first distance between the first component and the slave device, and a second distance between the second component and the slave device.

3. The method as claimed in claim 2, wherein the determining, based on the relative direction relationships of the at least two slave devices, a slave device located in the directly facing direction of the user as the target slave device, comprises:

calculating, for the each of the at least two slave devices, a distance difference between the first distance and the second distance; and determining, as the target slave device, a slave device that is located in the facing-toward direction of the user and has the smallest distance difference.

4. The method as claimed in claim 2, wherein the determining, based on the relative direction relationships of the at least two slave devices, a slave device located in the directly facing direction of the user as the target slave device, comprises:

selecting, based on the relative directions of the at least two slave devices, slave devices located in the facing-toward direction of the user;

calculating, for the each of the selected slave devices, a distance difference between the first distance and the second distance; and determining, as the target slave device, a slave device in the selected slave devices that has the smallest distance difference.

5. The method as claimed in claim 1, wherein the obtaining localization information of each of the at least two slave devices relative to a wearable device, comprises:

in response to the wearable device being in a worn state, obtaining the localization information of the each of the at least two slave devices relative to the wearable device, wherein the worn state indicates that the wearable device is worn by the user.

6. The method as claimed in claim 1, wherein the determining, based on the first angle and the second angle, a relative direction of the slave device with respect to the user, comprises:

for the each of the at least two slave devices, determining, in response to the first angle being less than the second angle, the relative direction of the slave device with respect to the user as the facing-toward direction; and determining, in response to the first angle being greater than the second angle, the relative direction of the slave device with respect to the user as the facing-away direction.

7. The method as claimed in claim 2, wherein the determining, based on the relative direction relationships of the at least two slave devices, a slave device located in a directly facing direction of the user as a target slave device, comprises:

obtaining a relative direction relationship between an i-th slave device and the user, where i is a positive integer and is less than or equal to the number of the at least two slave devices;

in response to the relative direction relationship indicating that the i-th slave device is located in the directly facing direction of the user, determining the i-th slave device as the target slave device; and in response to the relative direction relationship indicating that the i-th slave device is not located in the directly facing direction of the user, incrementing i by 1 and proceeding to the operation of obtaining a relative direction relationship between the i-th slave device and the user.

8. The method as claimed in claim 7, wherein the determining the i-th slave device as the target slave device, in response to the relative direction relationship indicating that the i-th slave device is located in the directly facing direction of the user, comprises:

calculating, in response to the i-th slave device being located in the facing-toward direction of the user, a distance difference between the first distance and the second distance of the i-th slave device; and determining the i-th slave device as the target slave device, in response to the distance difference of the i-th slave device being less than a preset threshold.

9. The method as claimed in claim 1, wherein the transmitting instruction information to the target slave device, comprises:

transmitting the instruction information carrying control voice information to the target slave device, wherein the control voice information is obtained based on the control voice collected by the master device or the slave device through a microphone.

10. The method as claimed in claim 1, wherein the master device further serves as one of the at least two slave devices; or the master device is a separate device from the at least two slave devices and is on a same local area network as the at least two slave devices; or the master device is a cloud device located on a wide area network.

11. A device, comprising a processor, a memory connected to the processor and computer instructions stored on the memory, wherein when the processor executes the computer instructions, a method for responding to a control voice is implemented, and the method comprises:

obtaining localization information of at least one slave device relative to a wearable device, wherein the device communicates with at least two slave devices including the at least one slave device, and the localization information of each of the at least one slave device is obtained based on location information of the wearable device collected by the slave device through a localization component;

in response to the wearable device being worn on a user, determining, based on the localization information, a target slave device located in a directly facing direction of the user; and transmitting instruction information to the target slave device, wherein the instruction information is configured to instruct the target slave device to respond to the control voice;

wherein the device stores a location topology relationship of the at least two slave devices, the determining, based on the localization information, a target slave device located in a directly facing direction of the user comprises:

determining, based on the localization information transmitted from a first slave device, a first relative direction relationship between the first slave device and the user; and determining, based on the first relative direction relationship and the location topology relationship, the target slave device located in the directly facing direction of the user;

wherein the location topology relationship is represented by coordinates of each of the at least two slave device in a plane coordinate system constructed with the first slave device as an origin; and the obtaining localization information of at least one of the slave devices relative to a wearable device, comprises:

obtaining the localization information of the first salve device relative to the wearable device.

12. A non-transitory computer-readable storage medium storing computer instructions thereon, wherein the computer instructions, when being executed by a processor, cause a method for responding to a control voice to be implemented by a master device that communicates with at least two slave devices located in different orientations, and the method comprises:

obtaining localization information of each of the at least two slave devices relative to each of a first component and a second component of a wearable device, wherein the localization information of each of the slave devices is obtained based on location information of the first component and the second component collected by the slave device through a localization component, the first component is worn on a left side of a user, and the second component worn on a right side of the user;

determining, based on the localization information of each of the at least two slave devices, a relative direction relationship between the each of the at least two slave devices and the user, and determining, based on the relative direction relationships of the at least two slave devices, a slave device located in a directly facing direction of a user as a target slave device; and transmitting instruction information to the target slave device, wherein the instruction information is configured to instruct the target slave device to respond to the control voice;

wherein determining, based on the localization information of each of the at least two slave devices, a relative direction relationship between the each of the at least two slave devices and the user, comprises:

for the each of the at least two slave devices, constructing, based on the localization information of the slave device, a coordinate system by taking the slave device as an origin, a directly facing direction of the slave device as a positive y-axis, and a right side of the slave device as a positive x-axis;

determining a first angle between the positive x-axis and a connection line between the first component and the slave device, and determining a second angle between the positive x-axis and a connection line between the second component and the slave device; and determining, based on the first angle and the second angle, a relative direction of the slave device with respect to the user, wherein the relative direction comprises a facing-toward direction or a facing-away direction.

13. The device as claimed in claim 11, wherein the wearable device comprises a first component and a second component, the first component is worn on a left side of the user and the second component is worn on a right side of the user;

wherein the determining, based on the localization information transmitted from the first slave device, the first relative direction relationship between the first slave device and the user, comprises:

for the first slave device, obtaining, based on the localization information transmitted by the first slave device, first coordinates of the first component relative to the first slave device, and second coordinates of the second slave component relative to the first slave device; and determining, based on the first coordinates and the second coordinates, the first relative direction relationship between the first slave device and the user.

14. The device as claimed in claim 11, wherein the determining, based on the first relative direction relationship and the location topology relationship, the target slave device located in the directly facing direction of the user, comprises:

determining, based on the first relative direction relationship, a facing-toward direction of the user;

determining, based on the location topology relationship, a distance of each of the at least two slave devices from a ray where the facing-toward direction of the user is located; and determining, as the target slave device, a slave device having the smallest distance from the ray where the facing-toward direction of the user is located.

15. The non-transitory computer-readable storage medium as claimed in claim 12, wherein determining, based on the localization information of each of the at least two slave devices, a relative direction relationship between the each of the at least two slave devices and the user, further comprises:

for the each of the at least two slave devices, obtaining a first distance between the first component and the slave device, and a second distance between the second component and the slave device.

16. The non-transitory computer-readable storage medium as claimed in claim 15, wherein the determining, based on the relative direction relationships of the at least two slave devices, the slave device located in the directly facing direction of the user as the target slave device, comprises:

calculating, for the each of the at least two slave devices, a distance difference between the first distance and the second distance; and determining, as the target slave device, a slave device that is located in the facing-toward direction of the user and has the smallest distance difference.

17. The non-transitory computer-readable storage medium as claimed in claim 15, wherein the determining, based on the relative direction relationships of the at least two slave devices, the slave device located in the directly facing direction of the user as the target slave device, comprises:

selecting, based on the relative directions of the at least two slave devices, slave devices located in the facing-toward direction of the user;

calculating, for the each of the selected slave devices, a distance difference between the first distance and the second distance; and determining, as the target slave device, a slave device in the selected slave devices that has the smallest distance difference.

18. The non-transitory computer-readable storage medium as claimed in claim 12, wherein the obtaining localization information of each of the at least two slave devices relative to the wearable device, comprises:

in response to the wearable device being in a worn state, obtaining the localization information of the each of the at least two slave devices relative to the wearable device, wherein the worn state indicates that the wearable device is worn by the user.

19. The non-transitory computer-readable storage medium as claimed in claim 12, wherein the determining, based on the first angle and the second angle, a relative direction of the slave device with respect to the user, comprises:

for the each of the at least two slave devices, determining, in response to the first angle being less than the second angle, the relative direction of the slave device with respect to the user as the facing-toward direction; and determining, in response to the first angle being greater than the second angle, the relative direction of the slave device with respect to the user as the facing-away direction.

20. The non-transitory computer-readable storage medium as claimed in claim 15, wherein the determining, based on the relative direction relationships of the at least two slave devices, a slave device located in a directly facing direction of the user as the target slave device, comprises:

obtaining a relative direction relationship between an i-th slave device and the user, where i is a positive integer and is less than or equal to the number of the at least two slave devices;

in response to the relative direction relationship indicating that the i-th slave device is located in the directly facing direction of the user, determining the i-th slave device as the target slave device; and in response to the relative direction relationship indicating that the i-th slave device is not located in the directly facing direction of the user, incrementing i by 1 and proceeding to the operation of obtaining a relative direction relationship between the i-th slave device and the user.

\* \* \* \* \*